United States Patent [19]
Dunand

[11] 3,753,097
[45] Aug. 14, 1973

[54] GYROMAGNETIC RESONANCE SPECTROMETERS

[75] Inventor: Jean Jacques Dunand, Paris, France

[73] Assignee: Thomson-CSF, Paris, France

[22] Filed: Dec. 3, 1971

[21] Appl. No.: 204,485

[30] Foreign Application Priority Data
Dec. 4, 1970 France .......................... 7043782

[52] U.S. Cl. ............................................. 324/0.5 R
[51] Int. Cl. ............................................... G01n 27/78
[58] Field of Search ........................ 324/0.5 R, 0.5 A, 324/0.5 AH, 0.5 MA

[56] References Cited
UNITED STATES PATENTS
3,462,677  8/1969  Paitich .................... 324/0.5 AH
2,908,858  10/1959  Nelson ....................... 324/0.5 R

OTHER PUBLICATIONS
C. W. Fryer – An Automatically Stabilized Bridge Nuclear Magnetic Resonance Spectrometer – Jour. of Sci. Instr.–1969 Series 2–Vol. 2–pp. 230–234.

Primary Examiner—Michael J. Lynch
Attorney—John W. Malley, G. Lloyd Knight et al.

[57] ABSTRACT

In a gyromagnetic resonance spectrometer where the specimen is rotated about an axis, and where the polarization field is modulated at a low angular frequency $\Omega$, the synchronous detection of the HF components, in phase with the excitation, of the output signals from the resonant detector circuit gives a signal at the frequency $\Omega$, a d.c. component, and a component at the rotation speed which, by means of filters, are respectively directed to the recorder, to a circuit correcting the resonance frequency of, or the coupling in, the resonant detector circuit, and to a rotation speed measurement system.

5 Claims, 4 Drawing Figures

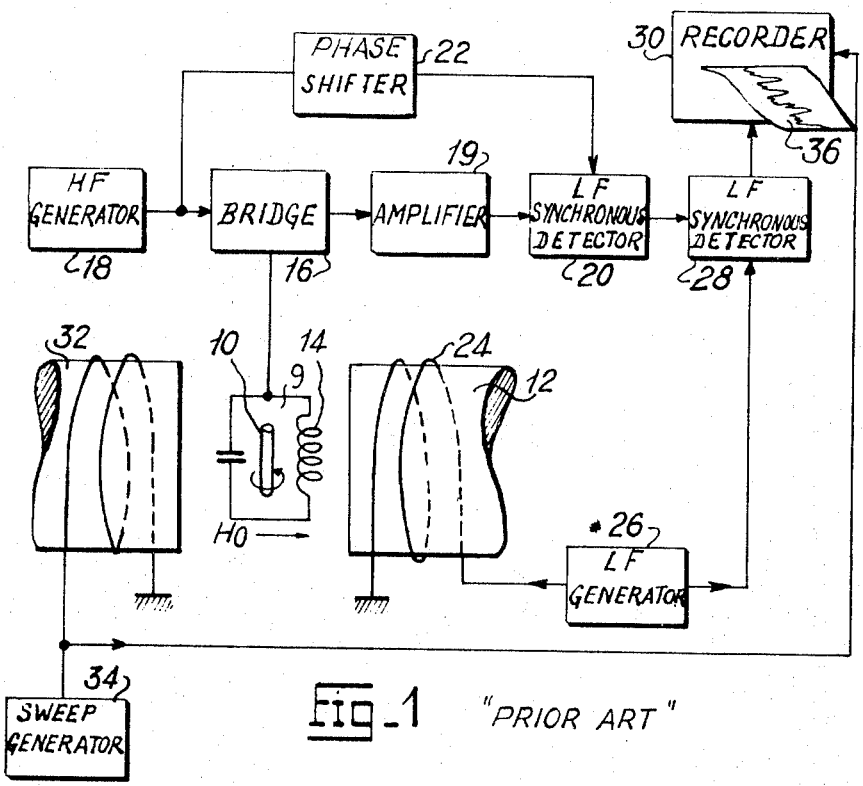
Fig_1 "PRIOR ART"
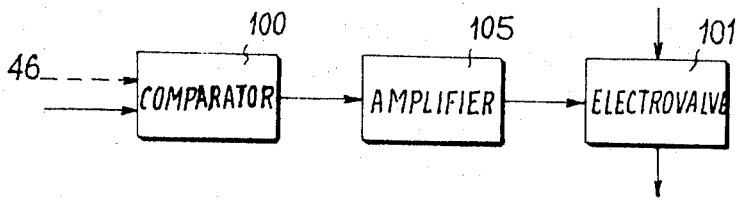
Fig_3

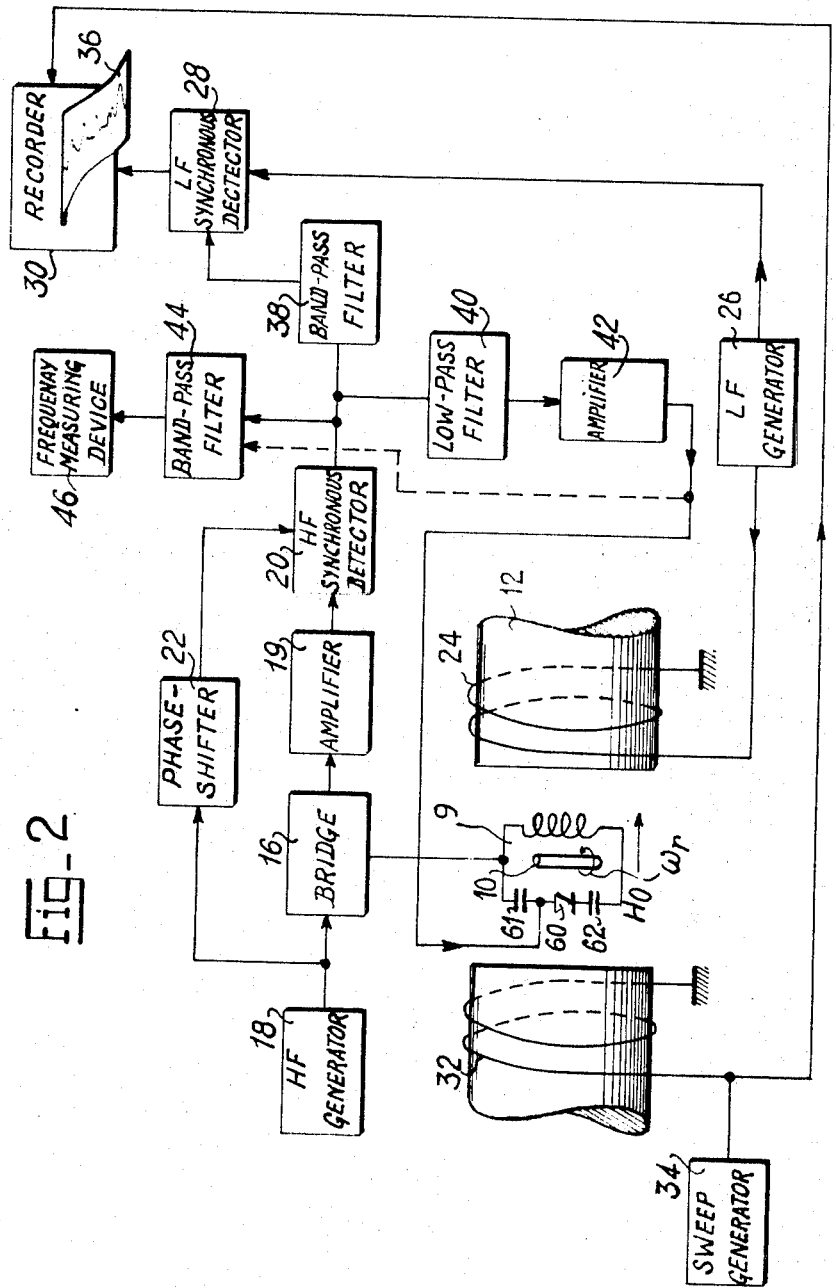

GYROMAGNETIC RESONANCE SPECTROMETERS

The present invention relates to gyromagnetic resonance spectrometers in which the chemical composition of a specimen or sample is analyzed through causing the different gyromagnetic resonances of the specimen, each corresponding to a constituent element of the specimen, to appear successively.

Gyromagnetic resonance spectrometers essentially comprise a high-frequency generator supplying a circuit which concentrates the electromagnetic energy on a specimen, the latter being arranged in a continuous magnetic polarization field. At resonance, the electrical properties of a resonant detector circuit, which contains the specimen, are modified and this modification is detected by a receiver assembly.

The specimen is contained in a tube and a rotary motion is imparted to the tube about the axis thereof in order to minimize the influence of the imperfect homogeneity of the magnetic field.

The rotation speed, for obvious reasons, should remain comprised in a certain range of speeds, of the order of 30 to 150 revolutions per second, for example. Consequently, it must be measured. To this end optical devices are generally resorted to which often are not convenient, in particular where super-conductive coils are used for the generation of the magnetic field.

The present invention has for its object a gyromagnetic resonance device provided with novel means for measuring the speed of rotation of the system.

According to the invention, there is provided a gyromagnetic resonance spectrometer comprising : a resonant detector circuit for receiving a specimen, means for generating a magnetic polarization field in said detector circuit, and a high frequency generator for generating an electromagnetic field in said detector circuit, said detector circuit delivering output signals comprising HF in-phase and quadrature components relatively to the HF excitation of said detector circuit ; means for rotating said specimen about an axis; a high frequency synchronous detector having a first input coupled to said detector circuit for receiving the output signal thereof, and a second input coupled to said high frequency generator for receiving a reference signal for detecting the HF in-phase components of said output signals; band-pass filtering means coupled to the output of said synchronous detector for selecting that low frequency component of the output signal of said synchronous detector which has a frequency equal to that of the rotation frequency of said specimen; and means for measuring the frequency of said low frequency component.

The invention will be better understood from the following description and appended drawings in which :

FIG. 1 is a schematic diagram of a gyromagnetic resonance spectrometer of the prior art;

FIG. 2 is a schematic diagram of an example of a spectrometer in accordance with the invention;

FIG. 3 shows an improvement of the spectrometer of FIG. 2 ;

Figure 4:
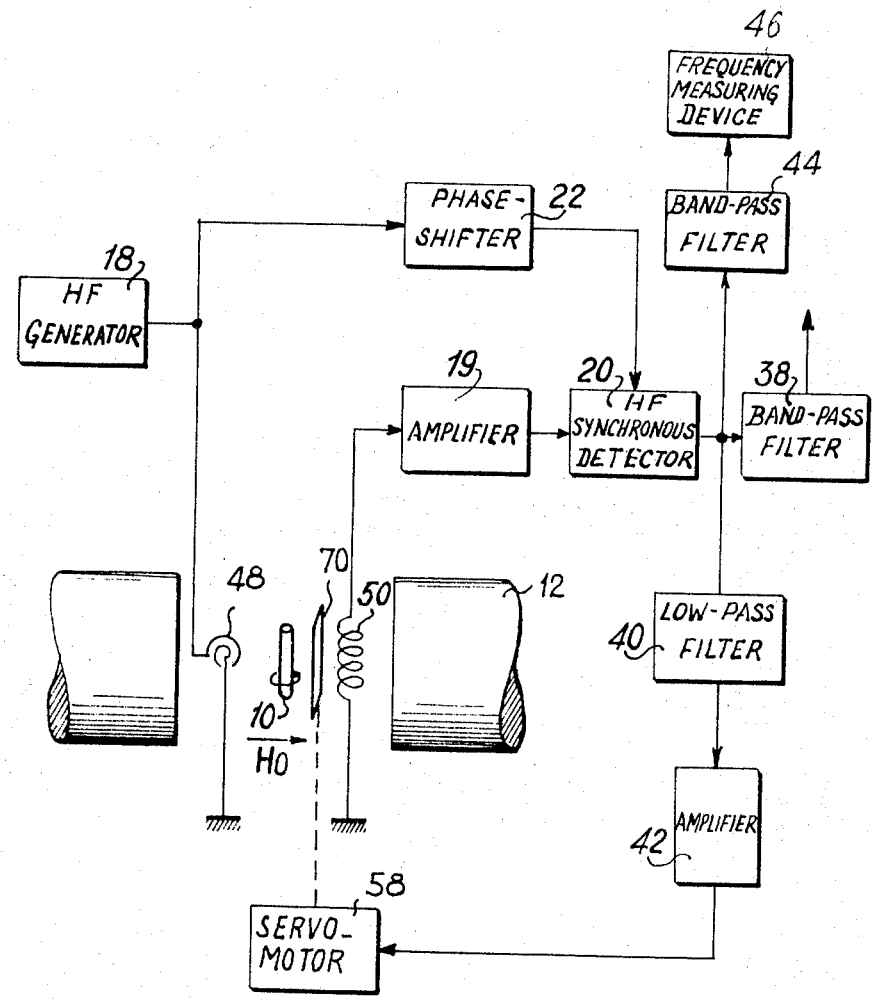
FIG. 4 illustrates a variant embodiments of a spectrometer according to the invention.

FIG. 1 illustrates a gyromagnetic resonance spectrometer in which the specimen 10 to be analyzed by gyromagnetic resonance, for example by resonance of the nuclear magnetic moments of the specimen, is arranged in a polarization magnetic field of strength $H_o$ produced by an electro-magnet 12. The specimen 10 is tightly coupled with a coil 14, whose axis is perpendicular to the lines of force of the field $H_o$, and which forms part of a resonant circuit 9 arranged in one arm of a high-frequency bridge 16. This bridge is supplied by a radio frequency generator 18 producing an angular frequency $\omega_o$ (60 Mc/s for example). This kind of circuit is conventional and is often referred to either as a balanced bridge or oscillating detector. The output signal from the bridge is amplified by an amplifier 19. A high frequency synchronous detector 20 receives the output signal from the amplifier 19 and a reference signal, of very much higher amplitude, from the generator 18 through a variable phase-shifter 22.

The spectrometer of FIG. 1 also comprises means for, in addition, modulating at a low frequency $\Omega$ the polarization field. However, it will first be assumed that such a modulation does not take place.

Under those conditions, the resonance signal corresponding to a given constituent of the specimen comprises two HF components A and D, in phase quadrature, which may be written $D + jA$, D being a dispersion signal, in phase with the excitation, and A an absorption signal phase shifted by 90° relatively thereto. In a general way a HF component of the output signal from the detector circuit in phase with the excitation will be referred to as an in-phase component, and a HF component of this output signal in phase-quadrature relatively to the excitation, will be called a quadrature component. If it is chosen to use the absorption signal, as is generally the case, the phase-shifter 22 will be so adjusted that the synchronous detector should detect signal A, that is to say the phase-shifter 22 will be set to provide a signal having in phase quadrature with the in-phase component at the input of the synchronous detector ; for a phase-shift differing from the latter phase-shift by 90°, the synchronous detector will supply a detected dispersion signal.

The polarization field is made to vary slowly so that the various resonances of the nuclei of the specimen should be successively detected.

For this purpose, the coils 32 are supplied from a sweep generator 34 which produces a current which varies in sawtooth fashion over a long period of time (some few seconds to some few minutes). The motion of the recording tape of a recorder 30 is synchronized with the sweep generator 34 so that a graph of the resonance spectrum as a function of the value of the polarization field $H_o$ should be obtained. Such a graph may be obtained through applying to the recording input of the recorder the output signal from the synchronous detector 20.

However, in most spectrometers, the recorded signal is obtained in a more elaborate way, as shown in FIG. 1 :

The polarization field is modulated at a low angular frequency $\Omega$ corresponding to 10 Kc/s for example) by an auxiliary field $H_m$, the latter being generated by modulation coils 24, fed from a generator 26 at the frequency $\Omega$.

Under those conditions, resonance will be obtained,- not only for a polarization field $H_o$ and a gyromagnetic ratio $\gamma$, characteristic of a constituent of the specimen, such that $\gamma H_o = \omega_o$, but also such that $\gamma H_o = \omega_o - \Omega$, $\gamma H_o = \omega_o - 2\Omega$ etc., $\gamma H_o = \omega_o + \Omega$, $\gamma H_o = \omega_o + 2\Omega$ etc., The centre band signals corresponding to the different constituents of the specimen form a centre band spectrum, and corresponding spectra are obtained for the different side bands. The modulation frequency $\Omega$ is chosen sufficiently high to prevent an overlapping of the different spectra.

A spectrometer may operate with centre band signals or side band signals (generally first side band signals) and the range of variation of the strength of the polarization magnetic field is chosen accordingly.

It will now be assumed, by way of example, that the prior art spectrometers of FIG. 1, and the spectrometers according to the invention of FIGS. 2 and 4 operate on centre band signals.

This being the case, calculation shows, disregarding negligible terms, that a detected absorption component and a detected spectrum dispersion component, one of which is a d.c. component and the other one is at the frequency $\Omega$, both appear at the output of the synchronous detector 20. Which component is at the frequency $\Omega$ depends upon the phase-shift introduced by the phase shifter 22.

If it is chosen, as is usually the case, to use the absorption signal for the recording, the phase-shifter 22 is adjusted to provide for the detection of the in-phase HF component, in which case the detected absorption signal is at the frequency $\Omega$, while the detected dispersion signal is a d.c. component. The output signal from the synchronous detector 20 is applied to a second synchronous detector 28 which, on the other hand receives its phase reference signal at the frequency $\Omega$ from the low frequency generator 26. The second synchronous detector thus supplies the absorption signal at the frequency $\Omega$ to the recorder 30

To the arrangement which has just been described, there can be added a band filter (not shown) whose cut-off frequencies are chosen in such a way that the synchronous detector 28 only receives the components at the frequency $\Omega$.

In theory, the low-frequency modulation of the magnetic field, to which the specimen is subjected, enables the synchronous detector 28 to discriminate the useful resonance signal (absorption signal at the frequency $\Omega$) from the random variations in the output signal from the first synchronous detector 20 and due for example to shift in the frequency of the high-frequency generator 18, or to variations in the resonance frequency $\omega'_o$ of the resonant circuit, the nominal value of which is of course equal to $\omega_o$.

The difference between $\omega'_o$ and $\omega_o$ will be called the "frequency error."

In fact, a frequency error results in an in-phase component voltage proportional to $\omega_o - \omega'_o$ (HF "frequency error signal") at the input of the amplifier 19, which voltage tends to saturate this amplifier and impairs the operation of the synchronous detector 20.

A spectrometer according to the invention shown in FIG. 2, arranged in the same way except for a filter 38 which is inserted between the two synchronous detectors, and for the capacitive part of the resonant circuit 9 which now comprises in series a capacitor 61, a diode 60 of the varicap type, i.e. a diode whose capacity may be controlled by a voltage, and a capacitor 62. It also comprises additional elements which will be described hereinafter.

Means for rotating the specimen as indicated hereinabove are symbolically represented by an arrow around the specimen 10. A convenient method of achieving the requisite speed of rotation consists in driving the specimen through a compressed air turbine. This drive method is not readily conducive to a direct measurement of the speed. Moreover, the specimen may not be visible.

Due to the always imperfect symmetry of revolution of the rotating system, the resonance frequency of the resonant detector circuit will be modulated at the rotation frequency, the frequency error will contain a basic term and a term varying at this frequency, and so will the amplitude of the HF frequency error signal supplied by the bridge.

It being assumed as in the case of FIG. 1 that the phase-shifter 22 is set to provide for the detection, in the first synchronous detector, of the in-phase HF component, the output signal from this detector will comprise :

an absorption signal at the frequency $\Omega$ ;

a d.c. component, part of which is due to an in-phase dispersion signal and the remainder of which is due to the basic frequency error, the former being negligible as compared with the latter as long as the basic frequency error is not itself negligible;

a component at the frequency $\omega_r$ due to the modulation of the frequency error.

Those three components are respectively directed to the second synchronous detector 28, to a frequency error correction system, and to a rotation speed measurement system by means of the filters 38, 40 and 44 connected in parallel to the output of the synchronous detector 20.

The filter 38, which is a band pass filtered centered on the frequency $\Omega$, could be eliminated since the synchronous detector 28 anyhow will only detect the component at the frequency $\Omega$. However, it may be useful to avoid a saturation of the low frequency synchronous detector 28.

The synchronous detector 28 receives the output signal from the filter 38 and supplies the absorption signal to the recorder 30. A variable phase-shifter (not shown) is, if necessary, arranged between the generator 26 and the synchronous detector 28 in order to ensure complete phase coincidence between the detected signal at the frequency $\Omega$ and the reference signal.

The filter 44 is a band-pass filter, whose top and bottom cut-off frequencies are selected as a function of the maximum and minimum speeds of rotation. A rotation speed of 70 revolutions per second is currently used, with a maximum in the order of 200 revolutions per second. Under these conditions, a band-pass filter whose cut-off frequencies are in the order of 200 c/s and 20 c/s will be satisfactory. The filter 44 feeds a frequency measuring and displaying device 46.

The device 46 may be of any known type for measuring and displaying a very low frequency.

It may for example comprise a shaper circuit for converting its input signal into a rectangular wave signal, a pulse generating circuit triggered by the rising fronts of this square circuit signal and supplying a pulse of predetermined amplitude and duration for each rising front and an R-C circuit integrating those pulses and delivering a continuous signal whose amplitude is a function of the frequency of the input signal, and which may actuate the needle of a displaying instrument.

The voltage thus obtained may in addition be used to control the rotation speed of the specimen, as shown in FIG. 3.

A comparator circuit 100 receives at its first input the above mentioned continuous voltage from an output of the device 46, and at its second input a reference voltage corresponding to the desired rotation speed. The output signal from the comparator is amplified in an amplifier 105 for controlling an electrovalve 101 which itself controls the flow of compressed air applied to the turbine.

The d.c. output component of the phase-detector 20 is picked off in a correcting loop containing a low-pass filter 40 and a loop amplifier 42. This error signal delivered by the amplifier 42 controls the diode 60 arranged in the resonant circuit 9 in order to adjust its resonance frequency $\omega'_o$. It could equally well operate a servo-motor controlling a variable capacitor of the resonant detector circuit.

Of course, the error signal may also be used to control the frequency of the generator 18, but this is less advantageous in that it modifies the values of the polarization field corresponding to the different resonances.

It may be chosen to take into account the basic frequency error or the whole of the frequency error for the correction of the frequency of the detector resonant circuit. In the second case, the filter 40 and the amplifier 42 should let through the component at the $\omega_r$ frequency. It is then preferable to supply the filter 44 from the amplifier 42, as indicated in a broken line in the drawing, so as to benefit from the gain of the amplifier 42 for the measurement of the rotation speed.

An arrangement similar to that illustrated in FIG. 2 can be utilized in the case of a spectrometer in which detection is effected by means of Bloch coils.

FIG. 4 illustrates part of the block diagram of such a spectrometer; those of the components which are shown and correspond to those already illustrated are indicated by the same reference numbers. A pair of Bloch coils, 48 and 50, perpendicular to each other and perpendicular to the lines of force of the field $H_o$, here constitutes at the same time the resonant circuit and the bridge. The coil 48 is supplied by the generator 18 while the coil 50 supplies the amplifier 19.

The coils 48 and 50 form with respective capacitors (not shown) two resonant parts of the circuit, tuned to the frequency $\omega_o$. However, this frequency is not so critical as was the case with the previously considered detector resonant circuit, and any frequency error gives rise only to negligible components in the output signal. But any variation in the coupling between the two coils 48 and 50 has the same effects as a frequency error in the spectrometers of FIGS. 1 or 2, i.e. it gives rise to an in-phase HF component ("coupling error" signal) in the output signal from the detector circuit.

If the specimen is rotated, the coupling between the two coils varies at the rotation frequency, and the coupling error signal is modulated at this frequency.

This being the case, the rotation speed signal and the useful absorption signal may be obtained and used on the same way as in the spectrometer of FIG. 2.

The coupling error may be corrected as shown in FIG. 4.

The position of that, 70, of the paddles with which the detector circuit is equipped, which tends to shift the phase of the leakage between the two coils without substantially absorbing energy is adjusted with the help of a servo-motor 58 operated by the error signal from the amplifier 42.

The invention has been described in the particular case where the spectrometer uses a low frequency modulation of the polarization field, and operates on centre band signals, with an HF synchronous detection of the in-phase components of the signals from the detector circuit.

If the spectrometer operates on the first side band resonance signals, a high frequency synchronous detection of the in-phase component will still supply a rotation speed signal at the frequency $\omega_r$, a d.c. signal representative of the basic term of the frequency error or of the coupling error (this time not added with a dispersion signal), and an absorption component at the frequency $\Omega$ which may be detected in the low frequency synchronous detector using a reference signal of suitable phase.

However, if the polarization field is unmodulated, two HF synchronous detection will be necessary, the detection of the quadrature component supplying the useful absorption signal, and the detection of the in-phase component, the basic frequency or coupling error signal (added up with the dispersion signal) and the low frequency rotation speed signal.

It will be observed that, whether a frequency error or a coupling error is to be corrected, the correction is always performed so as to minimize the d.c. component resulting from the HF synchronous detection of the in-phase components from the resonant detector circuit.

What is claimed is:

1. A gyromagnetic resonance spectrometer comprising: a resonant detector circuit for receiving a specimen, means for generating a magnetic polarization field in said detector circuit, and a high frequency generator for generating an electromagnetic field in said detector circuit, said detector circuit delivering output signals comprising HF in-phase and quadrature components relatively to the HF excitation of said detector circuit; means for rotating said specimen about an axis; a high frequency synchronous detector having a first input coupled to said detector circuit for receiving the output signal thereof, and a second input coupled to said high frequency generator for receiving a reference signal for detecting the HF in-phase components of said output signals; band-pass filtering means coupled to the output of said synchronous detector for selecting that low frequency component of the output signal of said synchronous detector which has a frequency equal to that of the rotation frequency of said specimen; and means for measuring the frequency of said low frequency component.

2. A gyromagnetic resonance spectrometer as claimed in claim 1, further comprising means for deriving an error signal representative of the difference between the frequency of said rotation signal and an assigned frequency, and applying said error signal to said rotating means.

3. A gyromagnetic resonance spectrometer as claimed in claim 1, further comprising: a low frequency generator for modulating said polarization field at an angular frequency $\Omega$; a low frequency synchronous detector for detecting that component of the output signal from said high frequency detector which is at said frequency $\Omega$; a low pass filter connected to the output from said high frequency synchronous detector; and correcting means, fed by said low pass filter, for acting on a high frequency element of said gyromagnetic device so as to minimize the d.c. component of the output signal from said high frequency synchronous detector.

4. A gyromagnetic resonance spectrometer as claimed in claim 3, wherein said resonant detector circuit comprises a variable capacity element, and wherein said correcting means are coupled to said variable capacity element.

5. A gyromagnetic resonance spectrometer as claimed in claim 3, wherein said resonant detector circuit comprises a pair of Bloch coils, and a paddle inserted between the coils of said pair for adjusting the phase of the leakage between said coils, and wherein said correcting means comprise a motor controlled by said low-pass filter and controlling said paddle.

* * * * *